(12) United States Patent
Pradeep et al.

(10) Patent No.: US 12,555,644 B2
(45) Date of Patent: Feb. 17, 2026

(54) LOGICAL MEMORY REPAIR WITH A SHARED PHYSICAL MEMORY

(71) Applicant: Google LLC, Mountain View, CA (US)

(72) Inventors: Wilson Pradeep, Bangalore (IN); Nikhil Karkare, Bangalore (IN)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 18/556,858

(22) PCT Filed: Nov. 17, 2021

(86) PCT No.: PCT/US2021/059736
§ 371 (c)(1),
(2) Date: Oct. 23, 2023

(87) PCT Pub. No.: WO2023/091130
PCT Pub. Date: May 25, 2023

(65) Prior Publication Data
US 2024/0203517 A1     Jun. 20, 2024

(51) Int. Cl.
*G11C 29/18*      (2006.01)
*G11C 29/00*      (2006.01)
*G11C 29/44*      (2006.01)

(52) U.S. Cl.
CPC .......... *G11C 29/4401* (2013.01); *G11C 29/18* (2013.01); *G11C 29/785* (2013.01); *G11C 2029/1802* (2013.01)

(58) Field of Classification Search
CPC ... G11C 29/4401; G11C 29/18; G11C 29/785; G11C 2029/1802; G11C 29/787;
(Continued)

(56) References Cited

U.S. PATENT DOCUMENTS 6,691,264 B2    2/2004   Huang
9,230,693 B1    1/2016   Lee
(Continued)

FOREIGN PATENT DOCUMENTS

KR     20100051804 A     11/2015
KR     20210117557 A      5/2025
(Continued)

OTHER PUBLICATIONS

"International Search Report and Written Opinion", Application No. PCT/US2021/059736, Aug. 11, 2022, 13 pages.
(Continued)

*Primary Examiner* — Mohammed A Bashar
(74) *Attorney, Agent, or Firm* — Colby Nipper PLLC

(57) ABSTRACT

This document describes techniques, methods, and apparatuses for logical memory repair. In some aspects, a memory built-in self-test (MBIST) controller can perform logical memory repair for a memory cluster including a shared bus interface that is coupled to the MBIST controller and configured to provide access to multiple logical memories. The memory cluster includes multiple physical memories that are coupled to the shared bus interface. At least one physical memory is configured to have two or more logical memories overlaid thereon. In example aspects, the physical memory includes arbitration logic coupled to a first address register and a second address register that are respectively configured to store a first faulty memory address and a second faulty memory address. The arbitration logic includes circuitry configured to arbitrate access to at least one spare memory portion responsive to the first faulty memory address conflicting with the second faulty memory address.

20 Claims, 9 Drawing Sheets

(58) Field of Classification Search
CPC .......... G11C 29/789; G11C 2029/1806; G11C 2029/4402; G11C 29/72; G11C 29/765; G11C 29/816; G11C 29/835
See application file for complete search history.

(56) References Cited

U.S. PATENT DOCUMENTS

| | | |
|---|---|---|
| 2003/0167428 A1 | 9/2003 | Gold |
| 2006/0161803 A1* | 7/2006 | Andreev ................ G11C 29/72 714/5.1 |
| 2010/0318843 A1 | 12/2010 | Singh et al. |
| 2011/0095803 A1* | 4/2011 | Meijer ................ G06F 1/3296 327/291 |
| 2014/0250341 A1 | 9/2014 | Mullarkey |
| 2015/0310933 A1 | 10/2015 | Purushotham et al. |
| 2019/0378575 A1* | 12/2019 | Lu ........................ G11C 29/50 |
| 2021/0124659 A1 | 4/2021 | Ryu et al. |
| 2021/0257043 A1 | 8/2021 | Rehmeyer et al. |
| 2021/0294791 A1 | 9/2021 | Narayanaswamy et al. |
| 2021/0295944 A1 | 9/2021 | Lim et al. |

FOREIGN PATENT DOCUMENTS

| | | |
|---|---|---|
| WO | 2006055862 A2 | 5/2006 |
| WO | 2023091130 | 5/2023 |

OTHER PUBLICATIONS

Benso, et al., "An on-line BIST RAM architecture with self-repair capabilities", Mar. 2002, pp. 123-128.
Fang, Baih. , "Embedded Memory BIST for Systems-on-a-chip", Oct. 2003, 99 pages.
Li, et al., "A Built-In Self-Repair Scheme for Semiconductor Memories with 2-D Redundancy", Oct. 2003, pp. 393-402.
Press, Ron, "Viewpoint: Memory BIST for shared-bus applications", Feb. 16, 2012, 3 apges.
Romain, et al., "Using Tessent MemoryBIST with Memory Shared Bus Interface", Oct. 2012, 38 pages.
Tseng, et al., "A Reconfigurable Built-In Self-Repair Scheme for Multiple Repairable RAMs in SOCs", Feb. 2007, 9 pages.
Wang, et al., "Test/repair Area Overhead Reduction for Small Embedded SRAMs", Dec. 2006, 6 pages.
"International Preliminary Report on Patentability", Application No. PCT/US2021/059736, May 2, 2024, 9 pages.
"Foreign Office Action", IN Application No. 202347060480, Nov. 4, 2025, 5 pages.
"Foreign Office Action", KR Application No. 10-2023-7032090, Dec. 3, 2025, 24 pages.

* cited by examiner

LOGICAL MEMORY REPAIR WITH A SHARED PHYSICAL MEMORY

RELATED APPLICATION(S)

This application is a national stage entry of International Application No. PCT/US2021/059736, filed Nov. 17, 2021, the disclosure of which is incorporated herein by reference in its entirety.

BACKGROUND

Computing devices, such as mobile phones and cloud servers, utilize physical and logical memories to store information. Processors of such computing devices perform functions and execute instructions based on the information stored within the physical and logical memories. If a physical or logical memory becomes corrupted or otherwise fails, the performance of a computing device with a processor relying on that physical or logical memory may be imperiled.

To reduce the chance that a failure of a physical or logical memory impacts a user, computing devices may utilize a built-in self-test (BIST) component. A BIST component can be included in a device to detect faults in circuitry generally. In the context of memory circuitry, a memory built-in self-test (MBIST) component can detect faults in the memory of a computing device. To do so, the MBIST component can store known values as data in a memory location and then retrieve the stored data from the location. If the retrieved data fails to match the known values, the MBIST component may infer that the memory is faulty.

SUMMARY

This document describes techniques and apparatuses for logical memory repair with a shared physical memory. A memory cluster can include multiple logical memories that are overlaid on multiple physical memories. For instance, a memory cluster may overlay two or more logical memories on a single physical memory such that the physical memory is shared by at least two logical memories. The memory cluster also includes a shared bus interface that enables components external to the memory cluster to access the logical memories without knowledge of the underlying physical memories. A memory built-in self-test (MBIST) controller may be located external of the memory cluster to enable the MBIST controller to test the multiple logical memories using, for instance, standardized MBIST algorithms. The MBIST controller may include built-in repair analysis (BIRA) functionality. The logic realizing the BIRA functionality can produce built-in self-repair (BISR) parameters on a per-logical-memory basis. The repair logic of each individual physical memory may be unable to process the BISR parameters properly because the MBIST controller produced the BISR parameters in terms of logical memories without considering the underlying physical memory. This can result in memory errors or nondeterministic signaling states that render an entire memory cluster defective and thus necessitate scrapping a whole integrated circuit chip.

To avoid creating such a defective memory condition, each physical memory of multiple physical memories of a memory cluster can include arbitration logic. The arbitration logic of an instance of physical memory can form at least part of a memory wrapper that supports memory portion redundancy for the physical memory instance in a manner that is transparent to an MBIST controller that is external to the memory cluster. This transparency enables an MBIST controller to test and repair multiple logical memories without accounting for the architecture of the underlying physical memory or memories. By enabling the MBIST controller to test logical memories from outside the memory cluster, the MBIST controller can employ and rely on time-tested MBIST algorithms.

The arbitration logic can be coupled between one or more registers holding BISR parameters and repair logic, which includes at least one repair port, that feeds into a memory decoder. In example operations, the arbitration logic converts from logical-memory level BISR parameters that are set by the external MBIST controller to physical-memory level signaling that can be utilized by the repair logic of the physical memory. In some cases, the arbitration logic can include one or more repair control ports that convert a targeted address and BISR parameters to signals that the at least one repair port of the repair logic properly interprets to replace faulty memory portions of the single physical memory as intended by the MBIST controller. For instance, arbitration logic can ensure that the repair logic does not attempt to simultaneously activate two replacement memory portions when a same faulty memory address is detected twice in the shared physical memory across the two or more logical memories.

In example aspects, an apparatus for logical memory repair is described. The apparatus includes a memory built-in self-test controller including circuitry that is configured to perform at least one test on multiple logical memories. The apparatus also includes a memory cluster that includes a shared bus interface and multiple physical memories. The shared bus interface is coupled to the memory built-in self-test controller and configured to provide access to the multiple logical memories. The multiple physical memories are coupled to the shared bus interface. The multiple physical memories include at least one physical memory configured to have two or more logical memories of the multiple logical memories overlaid thereon. The at least one physical memory includes a first address register configured to store a first faulty memory address as determined by the memory built-in self-test controller and a second address register configured to store a second faulty memory address as determined by the memory built-in self-test controller. The at least one physical memory also includes arbitration logic coupled to the first address register and the second address register. The arbitration logic includes circuitry configured to arbitrate access to at least one spare memory portion responsive to the first faulty memory address conflicting with the second faulty memory address.

In example aspects, a method for logical memory repair is described. The method includes performing, by a memory built-in self-test controller, at least one test on multiple logical memories. The method also includes identifying, by the memory built-in self-test controller, two or more faulty memory portions of at least one physical memory based on the performing. The method additionally includes loading, by the memory built-in self-test controller, a first address register with a first faulty memory address and a second address register with a second faulty memory address based on the identifying. The method further includes arbitrating, by the at least one physical memory, access to at least one spare memory portion, which corresponds to the two or more faulty memory portions, responsive to the first faulty memory address conflicting with the second faulty memory address.

In example aspects, an apparatus for logical memory repair is described. The apparatus includes a memory built-in self-test controller including circuitry configured to perform at least one test on multiple logical memories. The apparatus also includes a memory cluster. The memory cluster includes a shared bus interface coupled to the memory built-in self-test controller and configured to provide access to the multiple logical memories. The memory cluster also includes at least one physical memory coupled to the shared bus interface and configured to have two or more logical memories of the multiple logical memories overlaid thereon. The at least one physical memory includes one or more built-in self-repair registers configured to store one or more built-in self-repair parameters established by the memory built-in self-test controller based on the at least one test performed on the multiple logical memories. The at least one physical memory also includes repair logic and an address decoder coupled to the repair logic. The at least one physical memory further includes arbitration logic coupled between the one or more built-in self-repair registers and the repair logic. The arbitration logic includes circuitry configured to convert the built-in self-repair parameters into physical-memory level built-in self-repair parameters.

In other example aspects, techniques, processes, and computer-readable media for performing logical memory repair are disclosed. This Summary is provided to introduce simplified concepts of techniques, methods, and apparatuses for logical memory repair, the concepts of which are further described below in the Detailed Description and depicted in the Drawings.

BRIEF DESCRIPTION OF THE DRAWINGS

The details of one or more aspects of logical memory repair are described below. The use of the same reference numbers in different instances in the description and the figures may indicate similar elements.

Figure 1:
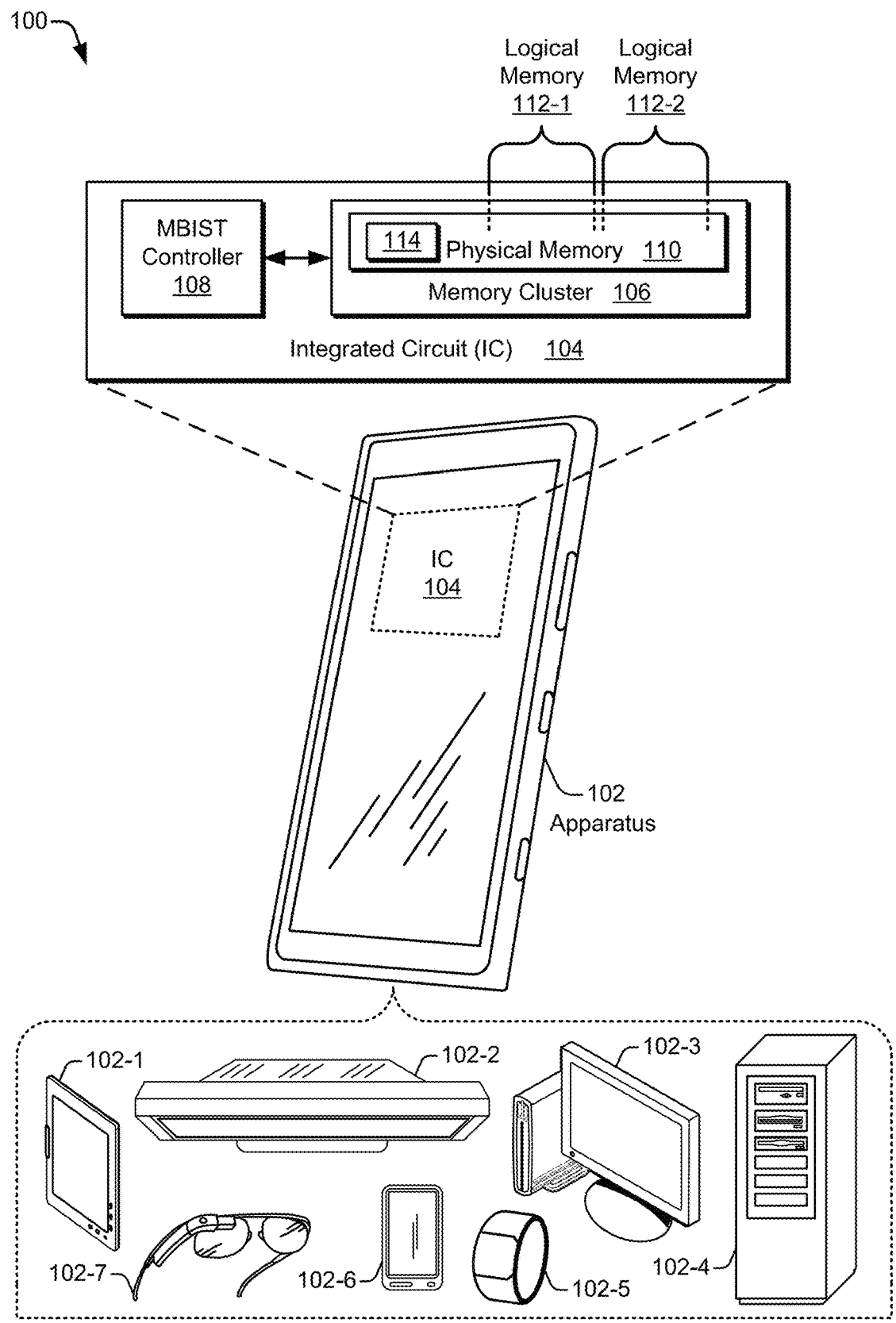
FIG. 1 illustrates an example operating environment in which logical memory repair with a shared physical memory may be implemented.

Although features and concepts of the described techniques and apparatuses for logical memory repair can be implemented in any number of different environments, aspects are described in the context of the following examples.

DETAILED DESCRIPTION

Overview

This document describes techniques and apparatuses for logical memory repair with a shared physical memory. An example type of memory organization that is used in computing devices is called a memory cluster. A memory cluster includes multiple physical memories that are interconnected via a shared bus. The memory cluster can also overlay multiple logical memories over the multiple physical memories. For instance, a single physical memory of the multiple physical memories may correspond to, include, or otherwise be shared by two logical memories of the multiple logical memories. The memory cluster also includes a shared bus interface that enables components external to the memory cluster to access the logical memories. Thus, in at least some cases, components that are external to the memory cluster cannot readily access the physical memories directly. Instead, an external component uses the storage resources of the memory cluster by accessing a logical memory through the shared bus interface.

A memory built-in self-test (BIST) controller may also be located external of a memory cluster. This arrangement can enable the memory BIST (MBIST) controller to test the multiple logical memories in a same manner as the logical memories are used by other external components. General MBIST techniques provide memory tests that are usually independent of the design or architectures in which such techniques are employed. Adding MBIST directly to the physical memories of a memory cluster would negatively impact the timing and performance of a shared bus architecture. Consequently, for purposes of MBIST testing, the MBIST controller and a test access port (TAP) are often located outside of the memory cluster. Thus, the circuitry used to access the logical memories is implemented in the MBIST interface outside the memory cluster. This approach preserves the performance of the shared bus while maintaining the benefits of self-test, analysis/debug, and repair associated with MBIST techniques.

MBIST technology that operates on logical memories through a shared bus interface has an architecture that does not interface directly with the physical memories being tested. The external MBIST controller may treat each logical memory as a separate test target, regardless of the number of whole or partial physical memories covered by a given logical memory. An MBIST controller can also include built-in self-repair (BISR) and/or built-in repair-analysis (BIRA) technology for use with shared-bus applications. The BISR registers that store BISR parameters resulting from BIRA, however, are located inside the memory cluster because such registers may be associated with particular physical memories to drive one or more corresponding memory repair ports of repair logic of each physical memory. This is acceptable because the BISR registers need not be located on the shared bus or other performance-critical paths. In some cases, the MBIST controller can use a separate serial port to load the self-repair registers.

As part of a testing operation, an MBIST controller applies specialized memory testing routines that include storing and retrieving data in particular patterns and orders to "stress" the memory arrays. The testing routines thereby elicit potential failure responses for memory locations that are part of an identifiable memory portion. The MBIST controller can include BIRA logic that establishes a replacement memory portion in response to detecting a faulty memory portion, such as a faulty memory row or column. During the testing of a memory cluster, the MBIST controller may sequentially test the logical memories thereof. Accordingly, the MBIST controller establishes BISR parameters for each logical memory separately from those of other logical memories and without regard for at least one underlying physical memory, including potentially a shared physical memory. If two or more logical memories overlay a same physical memory (e.g., a shared physical memory), for instance, the repair logic of that shared physical memory may be unable to properly identify or employ a replacement memory portion responsive to BISR parameters that conflict or cause conflicts due to the serialized analysis that does not consider underlying physical interrelationships. In short, this BISR malfunction can occur during regular, non-testing memory operations because the BISR parameters are determined in isolation with respect to each other.

To counteract such conflicts, in example implementations, each physical memory of multiple physical memories of a memory cluster can include arbitration logic. The arbitration logic is coupled between the repair logic of the physical memory and the BISR registers that store BISR parameters from the BIRA process. The arbitration logic can convert the BISR parameters that are determined at a logical-memory level to signaling (e.g., to one or more BISR values or voltages) that enable the repair logic to correctly operate the physical memory. This enables the repair logic to correctly select a spare memory portion for memory accessing responsive to a targeted memory portion being replaced by the BIRA process. For example, the arbitration logic can include one or more repair control ports that convert a targeted address and BISR parameters to signals that one or more repair ports of the repair logic can properly interpret to replace faulty memory portions as intended by the MBIST controller.

In some implementations, the arbitration logic of a respective physical memory can form at least part of a memory wrapper that supports memory portion redundancy in a manner that is transparent to an MBIST controller that is external to a memory cluster of the physical memory. This transparency enables one MBIST controller to test and repair multiple logical memories of the memory cluster without accounting for the underlying physical memory or memories. This, in turn, enables the MBIST controller to employ and rely on known, reliable MBIST algorithms.

Certain implementations can also increase repair coverage by enabling the use of all spare memory portions if required by a determined quantity of faulty memory portions. Thus, there need not be any bits that are automatically deemed irreparable. The strategies described herein can provide a lower defective parts per million (DPPM) by accounting for the potential conflicts described herein. The architecture can also offer an area improvement because although dedicated physical memories may have multiple instances of repair logic and associated BISR registers, a shared physical memory can be constructed with a single set of repair ports for a single instance of repair logic in some cases as described herein. Further, the arbitration logic need not add gates in a timing-critical path because the start-points can be from pseudo-static fuse registers. Other example implementations and advantages are described herein.

Example Devices

FIG. 1 illustrates an example operating environment 100 in which logical memory repair with a shared physical memory may be implemented. FIG. 1 illustrates, at 100 generally, an example apparatus 102 with an integrated circuit 104 (IC 104). In this example, the apparatus 102 is depicted as a smartphone. However, the apparatus 102 may be implemented as any suitable computing or electronic device.

Examples of the apparatus 102 include a mobile electronic device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., goggles, watch, or clothing), Internet of Things (IoTs) device, sensor, stock management device, electronic portion of a machine or a piece of equipment, server computer or portion thereof (e.g., a server blade or rack), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be mounted on a printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as a general-purpose processor, a system-on-chip (SoC), a security-oriented IC, a memory chip, a communications IC (e.g., a modem or a radio-frequency IC), a graphics processor, an artificial intelligence (AI) processor, combinations thereof, and so forth.

As shown, the integrated circuit 104 includes at least one memory cluster 106 coupled to a memory built-in self-test controller 108 (MBIST controller 108) and multiple other components (not shown). The memory cluster 106 includes at least one physical memory 110 with one or more associated logical memories. The associated logical memories may include at least a logical memory 112-1 and a logical memory 112-2. Although shown as being part of a single integrated circuit 104, the memory cluster 106 and the MBIST controller 108 may be disposed on separate integrated circuits and/or separate printed circuit boards.

The physical memory 110 features arbitration logic 114 utilized in a repair of the physical memory 110 in conjunction with the MBIST controller 108. The memory cluster 106 overlays a first logical memory 112-1 and a second logical memory 112-2 over the physical memory 110 such that the physical memory 110 is shared by the two logical memories. In example operations, the MBIST controller 108 may detect multiple faulty memory locations that correspond to multiple faulty memory addresses. In some cases, each logical memory 112 may include at least one respective faulty memory address, which can lead to conflicts between two or more faulty memory addresses.

To address such situations with multiple faulty memory addresses, the arbitration logic 114 can arbitrate access to at least one spare memory portion responsive to a first faulty memory address conflicting with a second faulty memory address. This is described further with reference to FIGS. 4 and 5. The memory cluster 106 and the MBIST controller 108 may be integrated on a single IC as shown; alternatively, two or more components, such as instances of logic and/or memory arrays, may be distributed across two or more ICs.

Examples of a memory cluster 106 that includes at least one physical memory 110 and multiple logical memories 112 are described next with reference to FIGS. 2 and 3.

Figure 2:
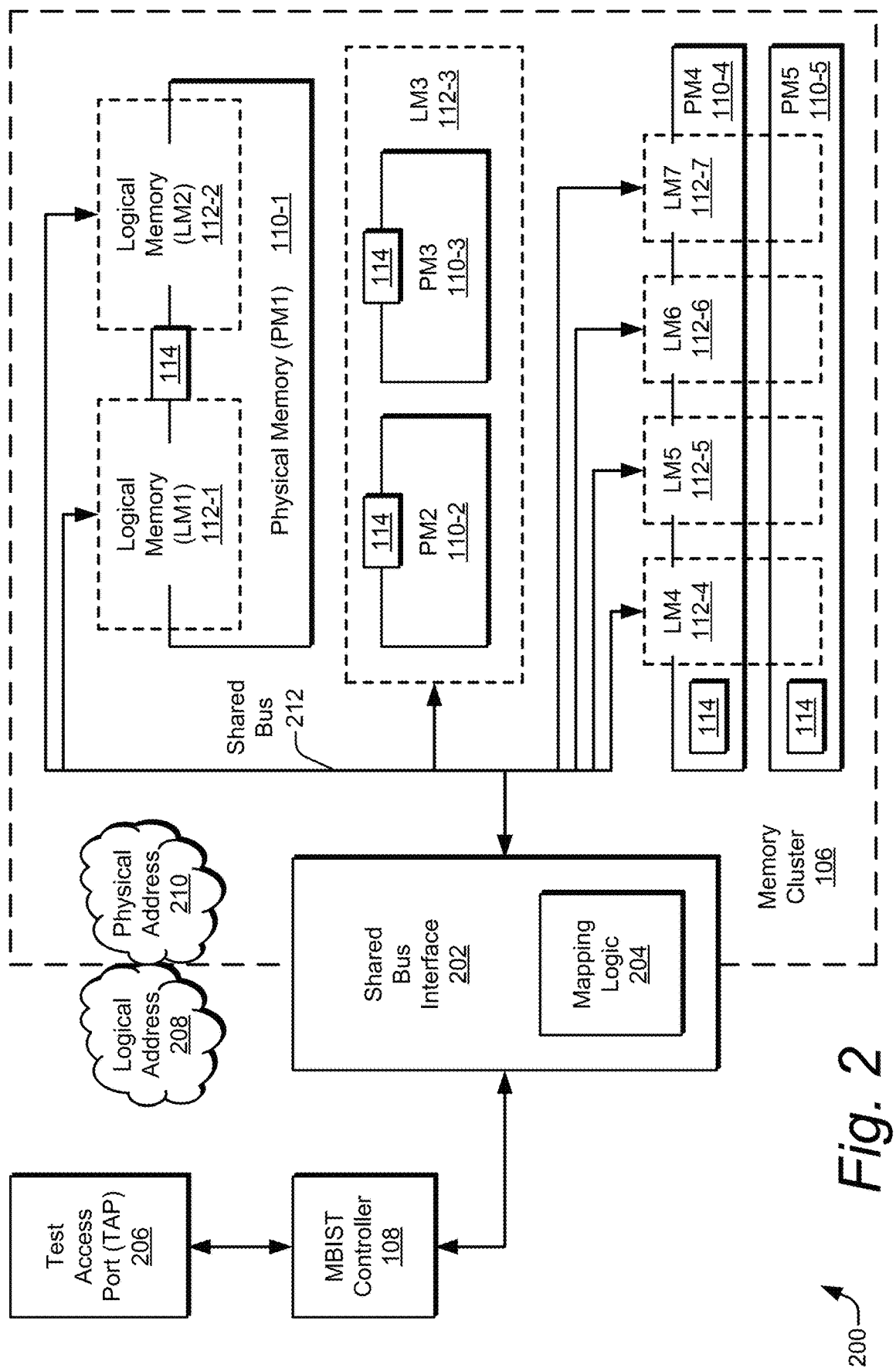
FIG. 2 illustrates an example architecture that can relate to logical memory repair including an MBIST controller and a memory cluster that includes a shared bus interface.

FIG. 2 illustrates an example architecture 200 that can relate to logical memory repair including the memory cluster 106 and the MBIST controller 108. The example architecture 200 includes a shared bus interface 202 that is part of, or integrated with, the memory cluster 106. As shown, the shared bus interface 202 may include mapping logic 204. A test access port 206 (TAP 206) can be coupled to the MBIST controller 108 to enable control of the MBIST controller 108 by another processor or circuit. The MBIST controller 108 can be coupled to the memory cluster 106 via the shared bus interface 202. The components of the memory cluster 106 may be integrated onto a single circuit or distributed across multiple integrated circuits and/or disposed on one or across multiple printed circuit boards.

In example implementations, a component that is external to the memory cluster 106 may use a logical address 208 to access the memories thereof. Within the memory cluster 106, however, the physical memories may be addressed using a physical address 210. To accommodate different addressing schemes (e.g., logical addresses external to the memory cluster 106 and physical addresses internal to the memory cluster 106), the shared bus interface 202 can include mapping logic 204. The mapping logic 204 maps between logical addresses 208 and physical addresses 210. Thus, for a communication (e.g., a memory request) propagating from the MBIST controller 108 to a physical memory 110, the mapping logic 204 converts a logical address 208 to a corresponding physical address 210. For a memory response that is part of a testing procedure, the mapping logic 204 can convert a physical address 210 to a corresponding logical address 208.

As shown, the memory cluster 106 can include multiple physical memories 110-1 to 110-5 and a shared bus 212. Although not explicitly shown in FIG. 2, each physical memory 110 is coupled to the shared bus 212, and the shared bus 212 is coupled to the shared bus interface 202. Thus, each physical memory 110 can be coupled to the shared bus interface 202 via the shared bus 212. Of the multiple physical memories 110-1 to 110-5, each respective physical memory 110 can include respective arbitration logic 114. The memory cluster 106 can also include multiple logical memories 112-1 to 112-7, which are described below. Although five physical memories 110 and seven logical memories 112 are shown, a given memory cluster 106 may have more or fewer than five or seven physical or logical memories, respectively. Further, a one-to-one correspondence between physical memories and logical memories may not be created, as is described next.

In some cases, a single physical memory may share multiple logical memories. For example, the memory cluster 106 features a first physical memory 110-1 (PM1) with a first logical memory 112-1 (LM1) and a second logical memory 112-2 (LM2) overlaid thereon. The physical memory 110-1 features arbitration logic 114 to arbitrate access to at least one spare memory portion thereof. An example instance that is analogous to these cases is described below with reference to FIG. 3. Examples in which spare memory portions correspond to memory rows in scenarios like these cases are described below with reference to FIGS. 6 and 7.

In other cases, multiple physical memories may correspond to a single logical memory. For example, the memory cluster 106 also features a second physical memory 110-2 (PM2) and a third physical memory 110-3 (PM3) that are associated with a single logical memory, a third logical memory 112-3 (LM3). The third logical memory 112-3 is distributed across two physical memories in such cases. The second physical memory 110-2 and the third physical memory 110-3 each features respective arbitration logic 114 to arbitrate access to at least one spare memory portion of the respective physical memory.

In still other cases, multiple physical memories may share multiple logical memories. For example, the memory cluster 106 also features a fourth physical memory 110-4 (PM4) and a fifth physical memory 110-5 (PM5) that correspond to a fourth logical memory 112-4 (LM4), a fifth logical memory 112-5 (LM5), a sixth logical memory 112-6 (LM6), and a seventh logical memory 112-7 (LM7). Each of the fourth, fifth, sixth, and seventh logical memories 112-4, 112-5, 112-6, and 112-7 is distributed across the fourth and fifth physical memories 110-4 and 110-5. The fourth physical memory 110-4 and the fifth physical memory 110-5 each features arbitration logic 114 to arbitrate access to at least one spare memory portion of the respective physical memory. Examples in which spare memory portions correspond to memory columns in scenarios like these cases are described below with reference to FIG. 8.

Figure 3:
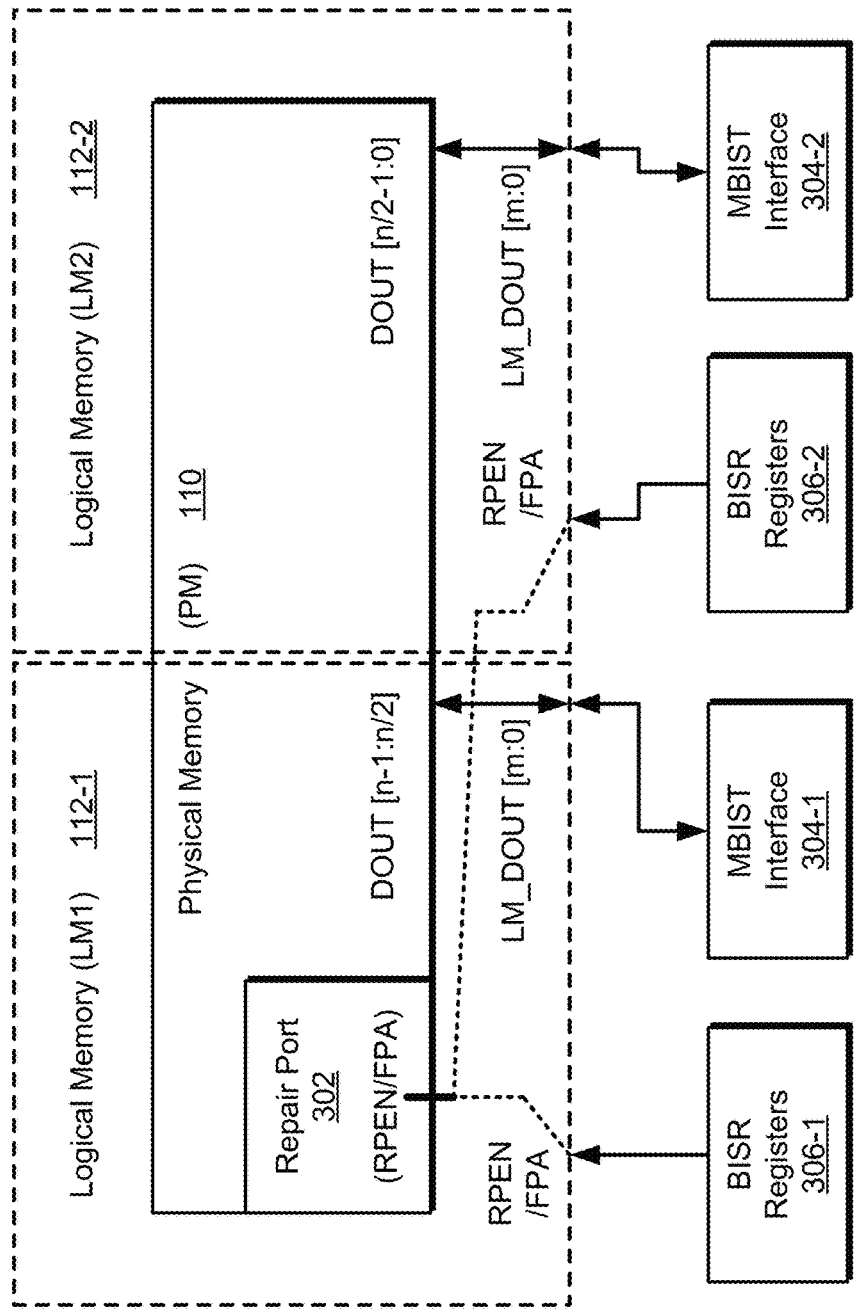
FIG. 3 illustrates an example arrangement of multiple logical memories and at least one physical memory in which logical memory repair with a shared physical memory may be performed.

FIG. 3 illustrates an example arrangement 300 of multiple logical memories and at least one physical memory in which logical memory repair with a shared physical memory may be performed. As illustrated in FIG. 3, a physical memory 110 is shared by two or more logical memories: a logical memory 112-1 and a logical memory 112-2. The physical memory 110 can include a repair port 302. The repair port 302 may include circuitry associated with one or more built-in self-repair (BISR) registers 306-1 and 306-2. Each BISR register 306 can include one or more flip-flops, with each flip-flop storing one bit of a BISR parameter.

In example implementations, the first and second BISR registers 306-1 and 306-2 may each store a faulty memory address (e.g., a faulty row address or an indication of a faulty column, such as an identified column of bits) and an indication of whether the corresponding BISR register 306 has been enabled. More generally, each BISR register 306 can store at least one Faulty memory Portion Address (FPA) and at least one Redundant memory Portion ENable (RPEN) indication. The faulty memory portion address may include at least as many bits as are used to identify the memory portion, and the redundant memory portion enable indication may include one bit. Values from the first and second BISR registers 306-1 and 306-2 are fed to the repair port 302, which may be associated with repair logic (not shown).

The physical memory 110 may be coupled to a first MBIST interface 304-1 and to a second MBIST interface 304-2 to access (e.g., send or receive) a data signal, such as to obtain a data output signal (DOUT). In this example, the physical memory 110 is wider than the two logical memories. As shown, each logical memory data out signal is "m" bits wide (LM_DOUT [m:0]). This "m-bits" width is half the bit-width of the underlying physical memory, which extends from DOUT [n−1:n/2] in one "half" and from DOUT [n/2−1:0] in the other "half" of memory. If each logical memory were wider than the underlying physical memory, the physical memory would not be tested twice. However, with each logical memory being narrower than the physical memory, the physical memory is tested twice—once for each logical memory—but not in a manner where the testing component can intelligently account for the double testing procedure in terms of accurately implementing a memory repair, as is described next.

In example operations, the MBIST controller 108 (e.g., of FIGS. 1 and 2) accesses the physical memory 110 in terms of the first logical memory 112-1 and the second logical memory 112-2 via the first MBIST interface 304-1 and the second MBIST interface 304-2, respectively. The MBIST controller 108 tests part of the physical memory 110 using the first MBIST interface 304-1 in accordance with the size and data widths of the first logical memory 112-1. The MBIST controller 108, therefore, populates the first BISR registers 306-1 based on test results that are obtained via the first MBIST interface 304-1 in terms of the first logical memory 112-1.

The MBIST controller 108 then tests another part of the physical memory 110 using the second MBIST interface 304-2 in accordance with the size and data widths of the second logical memory 112-2. The MBIST controller 108, therefore, populates the second BISR registers 306-2 based on test results that are obtained via the second MBIST interface 304-2 in terms of the second logical memory 112-2. Moreover, the MBIST controller 108 may be uninformed that these two tests for the two logical memories pertain to a same underlining physical memory or that the first and second BISR registers 306-1 and 306-2 relate to a common memory.

This can result in a situation where a same faulty memory portion address (FPA) is stored twice, once each in two or more different BISR registers. Such a situation can cause a conflict responsive to a subsequent access of the physical memory 110 in a standard, non-testing memory mode in which this same faulty memory portion address is targeted by a memory access request. For example, two memory portion redundancy-enable signals (e.g., two replacement enablement signals) may be activated at the same time, which can create a failure condition in a memory address decoder. To counter such a scenario, certain described implementations realize a memory wrapper that can transparently support memory portion redundancy in a memory cluster environment. Example memory wrapper implementations are described next with reference to FIG. 4.

Figure 4:
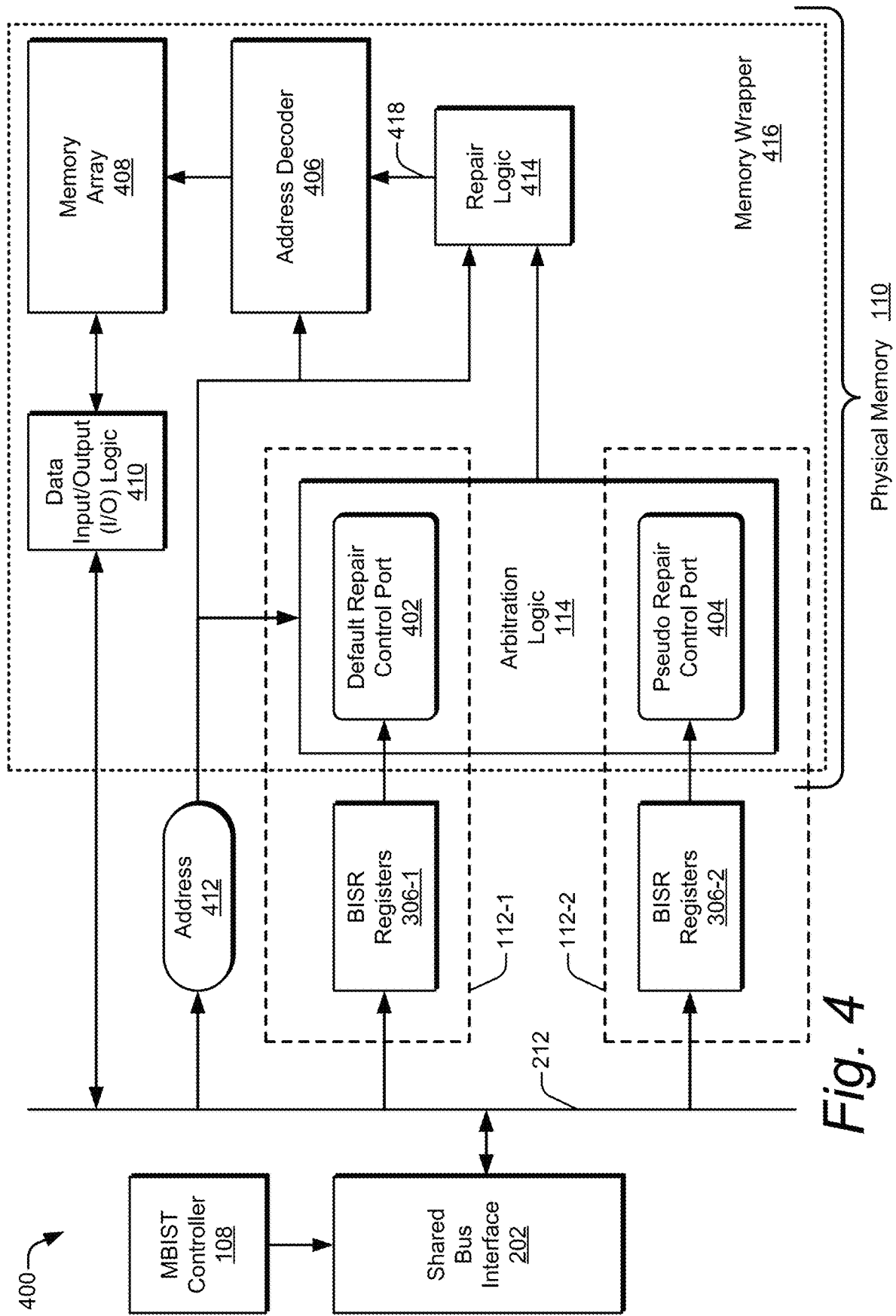
FIG. 4 illustrates an example architecture for implementing a memory wrapper with arbitration logic that can be used for performing logical memory repair.

FIG. 4 illustrates an example architecture 400 for implementing a memory wrapper with arbitration logic that can be used for performing logical memory repair. In example implementations, the physical memory 110 includes a memory wrapper 416 that supports memory portion redundancy in a cluster memory environment. The memory wrapper 416 enables the MBIST controller 108 to perform memory tests on logical memories without adjusting for one or more underlying physical memories.

As shown, the physical memory 110 includes at least one instance of repair logic 414, at least one address decoder 406, at least one memory array 408, and data input/output logic 410 (data I/O logic 410). The address decoder 406 can be coupled between the repair logic 414 and the memory array 408. The data I/O logic 410 can be coupled between the memory array 408 and the shared bus 212. The repair logic 414 provides at least one BISR indicator signal 418 (e.g., one or more memory portion redundancy-enable signals) to the address decoder 406. The BISR indicator signal 418 indicates whether a spare memory portion (not shown in FIG. 4) is to be accessed based on an address 412 that is being targeted by a memory access request and one or more BISR parameters of the BISR registers 306-1 and 306-2.

In some implementations, the arbitration logic 114 is coupled between the BISR registers 306-1 and 306-2 and the repair logic 414. The repair logic 414 may be coupled between the arbitration logic 114 and the address decoder 406. The first and second BISR registers 306-1 and 306-2 may be coupled between the shared bus 212 and the arbitration logic 114. The arbitration logic 114 interprets BISR parameters stored in the BISR registers 306-1 and 306-2 for at least one repair port (not shown) of the repair logic 414.

As part of the interpretation, the arbitration logic 114 can convert the BISR parameters to account for one or more logical memories that are overlaid on the physical memory 110. To do so, the arbitration logic 114 may implement two or more repair control ports, such as at least one default repair control port 402 and at least one pseudo repair control port 404. The repair control ports can enable the repair of a faulty memory portion, such as a faulty row or a faulty column, that is identified via testing of two or more logical memories. Generally, the repair logic 414 can direct a memory access request to a spare memory portion based on a memory address 412 that is targeted by a memory access request and at least one faulty memory address, such as a first faulty memory address and a second faulty memory address, that is stored in at least one BISR register 306.

In example operations, the data I/O logic 410 can store information into the memory array 408 or load information from the memory array 408 as part of one or more memory operations. The I/O logic 410 can communicate or propagate information between the memory array 408 and the shared bus interface 202 via the shared bus 212. The MBIST controller 108 operates through the shared bus interface 202 to perform a test on multiple addresses of at least one logical memory 112, such as the address 412 (e.g., a memory address). The address 412, which may be a physical address within the memory cluster, can be provided to the address decoder 406 and the repair logic 414. The arbitration logic 114 can also receive the address 412 to perform the arbitration in some cases.

The memory wrapper 416 can include (e.g., have or realize) multiple repair control ports, such as one repair control port per logical memory that is overlaid on the physical memory 110. Each respective logical memory 112 can correspond to a respective virtual repair control port created by the arbitration logic 114. As shown, the multiple repair control ports can include a default repair control port 402 and pseudo repair control port 404.

In some cases, the default repair control port 402 corresponds to a logical memory 112 that the MBIST controller 108 tests first. Each logical memory 112 that is tested subsequently can correspond to a pseudo repair control port like the pseudo repair control port 404. Thus, the first logical memory 112-1 can correspond to the default repair control port 402, the second logical memory 112-2 can correspond to the depicted pseudo repair control port 404, and a third logical memory (not shown in FIG. 4) can correspond to another pseudo repair control port 404 (not shown). Examples of repair control ports are described herein with reference to FIGS. 6-8.

Figure 5:
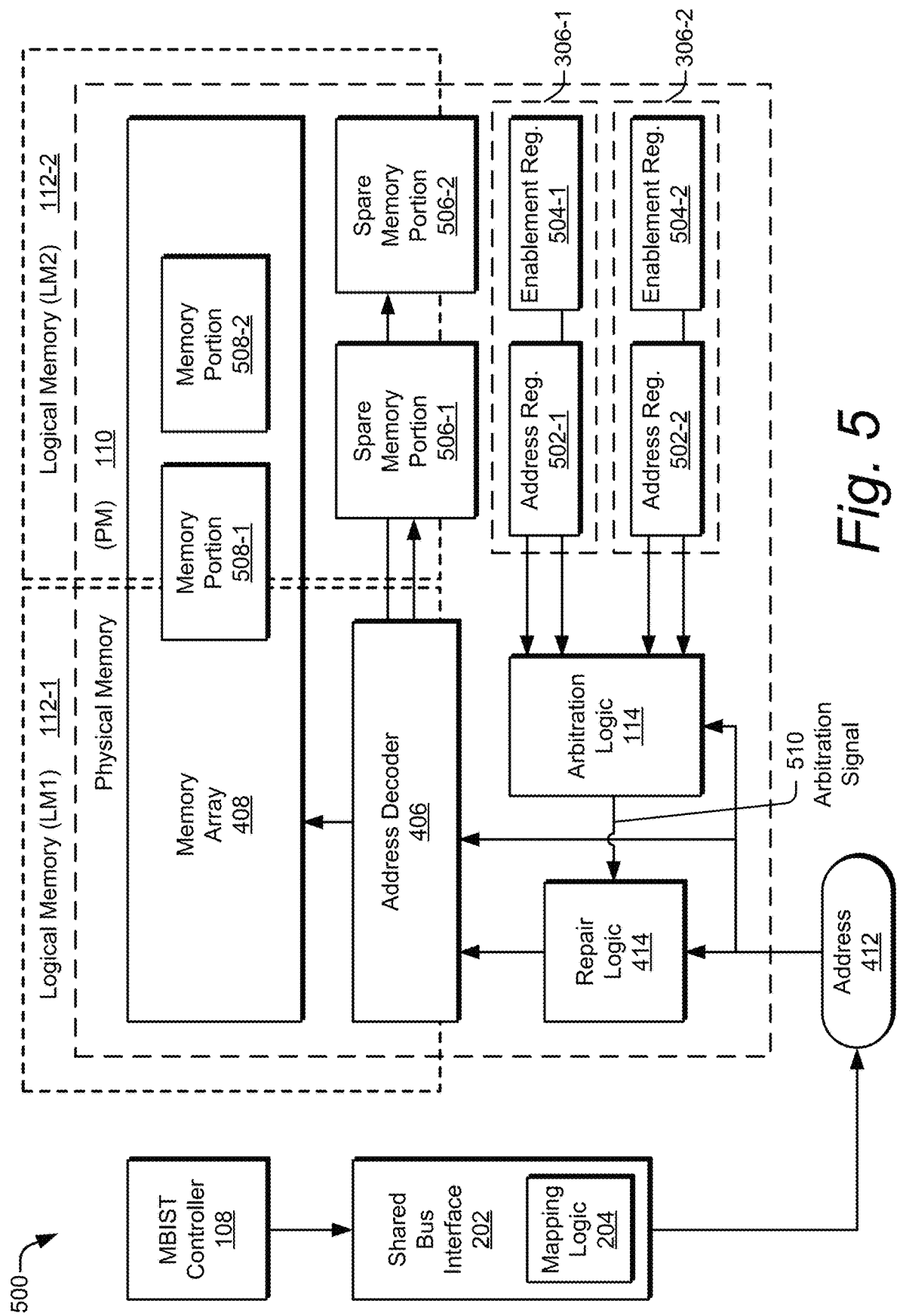
FIG. 5 illustrates an example architecture including arbitration logic and memory components for performing logical memory repair with at least one spare memory portion.

FIG. 5 illustrates an example architecture 500 including arbitration logic and memory components for performing logical memory repair with at least one spare memory portion. As shown, the physical memory 110 includes the arbitration logic 114, the repair logic 414, the address decoder 406, and the memory array 408. The memory array 408 includes multiple memory portions, such as a first memory portion 508-1 and a second memory portion 508-2. Each memory portion 508 can correspond to, for example, at least one memory row or at least one memory column. To enable redundancy for at least one memory portion 508 of the memory array 408, the physical memory 110 can include multiple spare memory portions, such as a first spare memory portion 506-1 and a second spare memory portion 506-2. Each spare memory portion 506 can likewise correspond to at least one spare memory row or at least one spare memory column. The physical memory 110 also includes the first BISR register 306-1 and the second BISR register 306-2 to store BISR parameters.

In example implementations, each BISR register 306 can include at least one address register 502 and at least one enablement register 504. Thus, the first BISR register 306-1 may include a first address register 502-1 and a first enablement register 504-1, and the second BISR register 306-2 may include a second address register 502-2 and a second enablement register 504-2. The first address register 502-1 can store a first faulty memory address as determined by the MBIST controller 108. The second address register 502-2 can store a second faulty memory address as determined by the MBIST controller 108. The first enablement register 504-1 can store an indication that a corresponding first (redundant) spare memory portion is enabled for usage as determined by the MBIST controller 108. The second enablement register 504-2 can store an indication that a corresponding second (redundant) spare memory portion is enabled for usage as determined by the MBIST controller 108.

To enable the arbitration logic 114 to analyze the faulty memory address and enablement indication parameters, the arbitration logic 114 can be coupled to the first address register 502-1, the second address register 502-2, the first enablement register 504-1, and the second enablement register 504-2. In some cases, the arbitration logic 114 includes circuitry to arbitrate access to at least one spare memory portion 506 responsive to the first faulty memory address conflicting with the second faulty memory address.

In example operations, the circuitry of the MBIST controller 108 determines a first faulty memory address corresponding to the at least one physical memory 110 by testing the first logical memory 112-1 and/or the second logical memory 112-2. The circuitry of the MBIST controller 108 also determines a second faulty memory address corresponding to the physical memory 110 by testing the first logical memory 112-1 and/or the second logical memory 112-2. The MBIST controller 108 can store the faulty memory addresses in the BISR registers 306-1 and 306-2 as part of a BISR procedure.

The first BISR register 306-1 includes the first address register 502-1 and the first enablement register 504-1 indicating if the first BISR register 306-1 has been enabled. For example, the first address register 502-1 can store the first faulty memory address that corresponds to the first memory portion 508-1 responsive to the MBIST controller 108 detecting that the first memory portion 508-1 is faulty. Further, the first enablement register 504-1 stores an affirmative indication that the first spare memory portion 506-1 is to be accessed if the first faulty memory address is being targeted—e.g., if the address 412 (of FIG. 4) corresponds to the first faulty memory address. The second BISR register 306-2 includes the second address register 502-2 and the second enablement register 504-2 indicating if the second BISR register 306-2 has been enabled.

In part because the MBIST controller 108 tests the multiple logical memories 112-1 and 112-2 sequentially and at least partially independently, the MBIST controller 108 may store a same faulty memory address in the first address register 502-1 and in the second address register 502-2. Absent the arbitration logic 114, this can cause the repair logic 414 to activate two spare memory portions simultaneously—e.g., during a single memory access. The arbitration logic 114, however, operates to prevent this error condition. To do so, the first BISR register 306-1 and the second BISR register 306-2 provide address and enablement information to the arbitration logic 114.

The arbitration logic 114 processes the address and enablement BISR parameters to resolve a single spare memory portion 506 for accessing if a corresponding memory portion 508 was identified as being faulty. The arbitration logic 114 provides converted BISR parameter information to one or more repair ports (not shown) of the repair logic 414 so that the repair logic 414 can activate a single spare memory portion 506 for a given memory access using the address decoder 406.

Thus, the physical memory 110 includes the repair logic 414 to direct a memory access request to a spare memory portion (e.g., 506-1 or 506-2) based on a memory address 412 targeted by a memory access request, a first faulty memory address (e.g., that is stored in the first address register 502-1), and a second faulty memory address (e.g., that is stored in the second address register 502-2). To do so, the repair logic 414 communicates with the address decoder 406, which is coupled to the memory array 408 and/or at least one spare memory portion 506. The repair logic 414 may be coupled between the arbitration logic 114 and the address decoder 406. The arbitration logic 114 can be coupled between the repair logic 414 and the BISR registers 306-1 and 306-2. This can enable the arbitration logic 114 to convert one or more BISR parameters that are stored in the BISR registers 306-1 and 306-2 into at least one arbitration signal 510 for the one or more repair ports of the repair logic 414 to ensure that multiple spare memory portions 506-1 and 506-2 are not simultaneously activated.

During a testing phase, the circuitry of the MBIST controller 108 accesses multiple logical memories (e.g., 112-1 and 112-2) using logical memory addresses. The mapping logic 204 of the shared bus interface 202 can map the logical memory addresses to physical memory addresses, which are memory addresses associated with the physical memory 110. If the MBIST controller 108 determines that the logical memories 112-1 and 112-2 are faulty due to one or more memory locations, the first faulty logical memory (e.g., 112-1) and the second faulty logical memory (e.g., 112-2) thus share the same physical address space of the physical memory 110. Consequently, a first faulty memory address and a second faulty memory address may correspond to a common faulty memory portion (e.g., the first memory portion 508-1) or a same spare memory portion (e.g., the spare memory portion 506-1) as indicated by the BISR parameters stored in the BISR registers 306-1 and 306-2. In some of such cases, the circuitry of the arbitration logic 114 can route memory requests that are associated with different logical memories (e.g., 112-1 and 112-2) but that target the same physical memory address to the same spare memory portion 506-1.

After the testing phase, the first enablement register 504-1 may store a first indication of whether a first faulty memory portion 508-1 has been replaced by a corresponding first spare memory portion 506-1, with the first faulty memory portion 508-1 corresponding to a first faulty memory address. The second enablement register 504-2 may store a second indication of whether a second faulty memory portion 508-2 has been replaced by a corresponding second spare memory portion 506-2, with the second faulty memory portion 508-2 corresponding to a second faulty memory address. The circuitry of the arbitration logic 114 can arbitrate access to the first spare memory portion 506-1 as well as the second spare memory portion 506-2 responsive to the first indication and the second indication. For example, the arbitration logic 114 can utilize a first memory portion redundancy-enable signal and a second memory portion redundancy-enable signal as generated by the repair logic 414 to prevent two or more spare memory portions from being simultaneously active responsive to the first faulty memory address matching the second faulty memory address.

Figure 6:
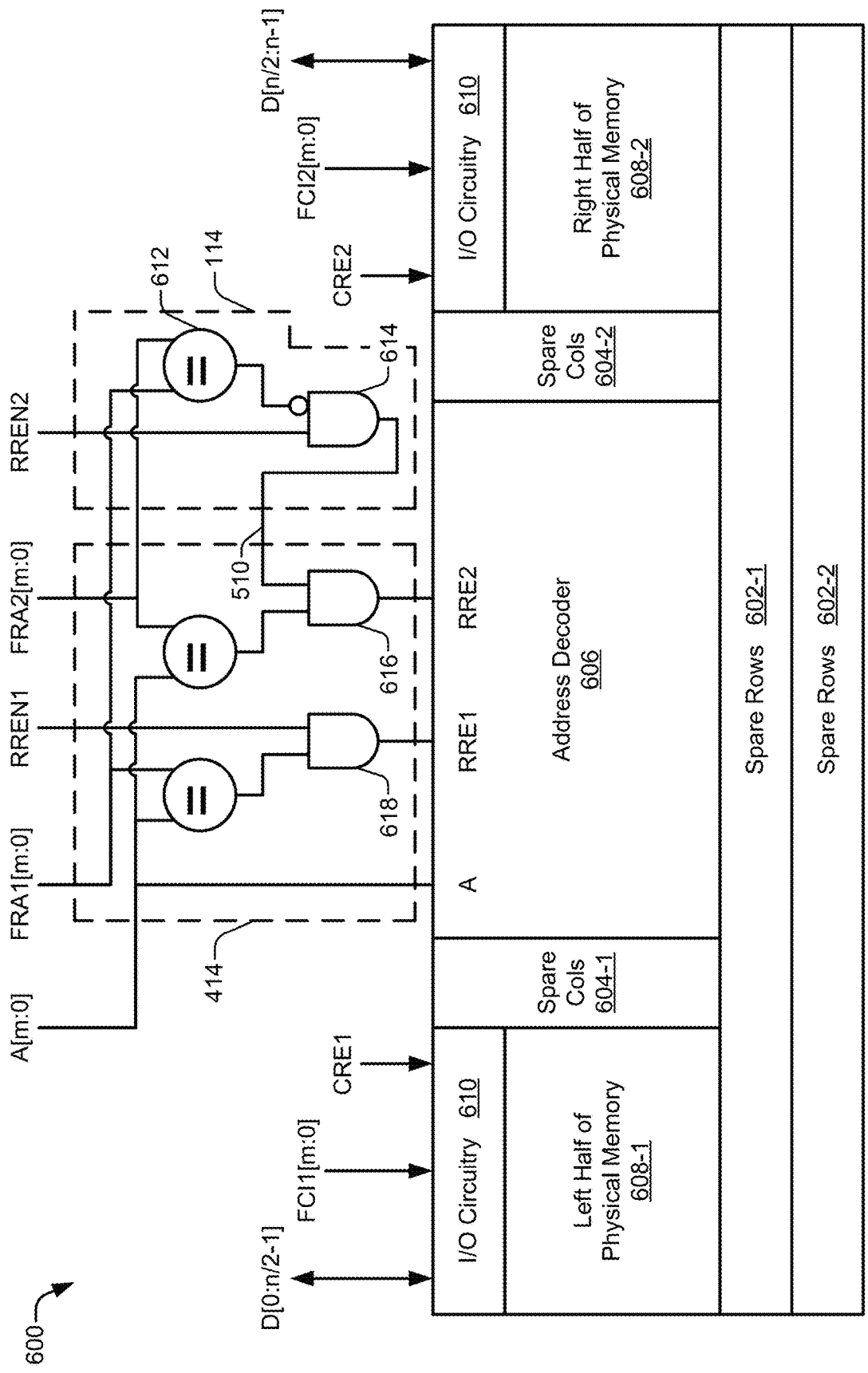
FIG. 6 illustrates example circuitry for an example first approach to performing logical memory repair in which a spare memory portion is implemented with a spare memory row.

FIG. 6 illustrates example circuitry 600 for an example first approach to performing logical memory repair in which a spare memory portion is implemented with a spare memory row. Thus, each of the spare memory portions 506-1 and 506-2 can be realized with a spare memory row 602-1 or 602-2. In such cases, a first faulty memory address and a second faulty memory address can include at least one faulty row address (FRA) of a memory row that is faulty of a physical memory.

For clarity, the physical memory of FIG. 6 is a split memory having a left half of physical memory 608-1 and a right half of physical memory 608-2. Further, a first logical memory (not shown in FIG. 6) is overlaid on the left half of physical memory 608-1, and a second logical memory (not shown) is overlaid on the right half of physical memory 608-2. The spare columns 604-1 and 604-2 are not shared between the left and right halves of the physical memory 608-1 and 608-2 in this split memory example. Accordingly, the arbitration logic 114 may not be applied to column redundancy BISR parameters or indications of a faulty column in such architectures.

The spare rows 602-1 and 602-2, however, are shared between the left and right halves of the physical memory 608-1 and 608-2. Accordingly, the arbitration logic 114 may be applied to prevent conflicts with faulty memory row addresses. An environment with a physical memory that is split into halves and has a logical memory respectively applied to each half is used to describe certain principles with reference to FIG. 6 here and FIG. 7 below. The principles presented are applicable, however, to other quantities and combinations of physical memory and logical memory.

The example circuitry 600 can also include spare columns 604-1 and 604-2, an address decoder 606, and I/O circuitry 610. Illustrated signals include an address (A[m:0]) targeted for a memory access of a logical memory, a first faulty row address (FRA1[m:0]), a first redundant row enable signal (RREN1), a second faulty row address (FRA2[m:0]), and a second redundant row enable signal (RREN2). Other illustrated signals include a first data portion (D[0:n/2−1]), a first faulty column indicator (FCI1[m:0]), a first redundant column enable signal (CRE1) or first column redundancy-enable signal, a second redundant column enable signal (CRE2) or second column redundancy-enable signal, a second faulty column indicator (FCI2[m:0]), and a second data portion (D[n/2:n−1]). The address decoder 606 can receive the address (A) and, from the repair logic 414, a first row redundancy-enable signal (RRE1) and a second row redundancy-enable signal (RRE2).

If the circuitry 600 of FIG. 6 were to omit the arbitration logic 114, the second redundant row enable signal (RREN2) would be applied directly to the second input of the "right" (as depicted) AND gate 616 via a repair port of the repair logic 414. In some defect scenarios, an MBIST controller can load a same faulty row address into two BISR registers such that the first faulty row address (FRA1[m:0]) and the second faulty row address (FRA2[m:0]) match. When the targeted address (A) is the same as the matching faulty row address, the repair logic 414—absent the arbitration logic 114—would drive both the first and second row redundancy-enable signals (RRE1 and RRE2) active at the input of the address decoder 606. This would result in an error condition.

To counteract such scenarios, however, the circuitry 600 can include the arbitration logic 114. The example arbitration logic 114 of FIG. 6 includes a comparator 612 and an AND gate 614, which has a "regular" (non-inverting) input and an inverting input. In example operations, the comparator 612 receives the first and second faulty row addresses (FRA1 and FRA2) at first and second inputs thereof. Responsive to these two faulty row addresses being equal, the comparator 612 outputs a high signal. The inverting input of the AND gate 614 inverts this to a low signal. Responsive to processing at least one low signal, the AND gate 614 outputs a low signal, regardless of the value of the second redundant row enable signal (RREN2) at the non-inverting input. This low signal is coupled to an input of the AND gate 616 via a repair port of the repair logic 414 as an arbitration signal 510. The AND gate 616 therefore outputs a low value for the second row redundancy-enable signal (RRE2) to deactivate this input to the address decoder 606.

Meanwhile, one or more repair ports of the repair logic 414 receive one or more BISR parameters "directly" (e.g., without being converted or modified by the arbitration logic 114) from the BISR registers 306-1 and 306-2 (not shown in FIG. 6). The "left" (as depicted) AND gate 618 of the repair logic 414 generates a high signal to activate the first row redundancy-enable signal (RRE1) at the address decoder 606. Thus, in scenarios in which both the first faulty row address (FRA1[m:0]) and the second faulty row address (FRA2[m:0]) match each other, as well as match the targeted address (A), the arbitration logic 114 causes the repair logic 414 to activate a single row redundancy-enable signal (RRE1 in this case) to avoid an error condition. The avoided error condition is the one that would result if multiple row redundancy-enable signals (RRE1 and RRE2) are activated during a single memory access cycle at two inputs to the address decoder 606.

Figure 7:
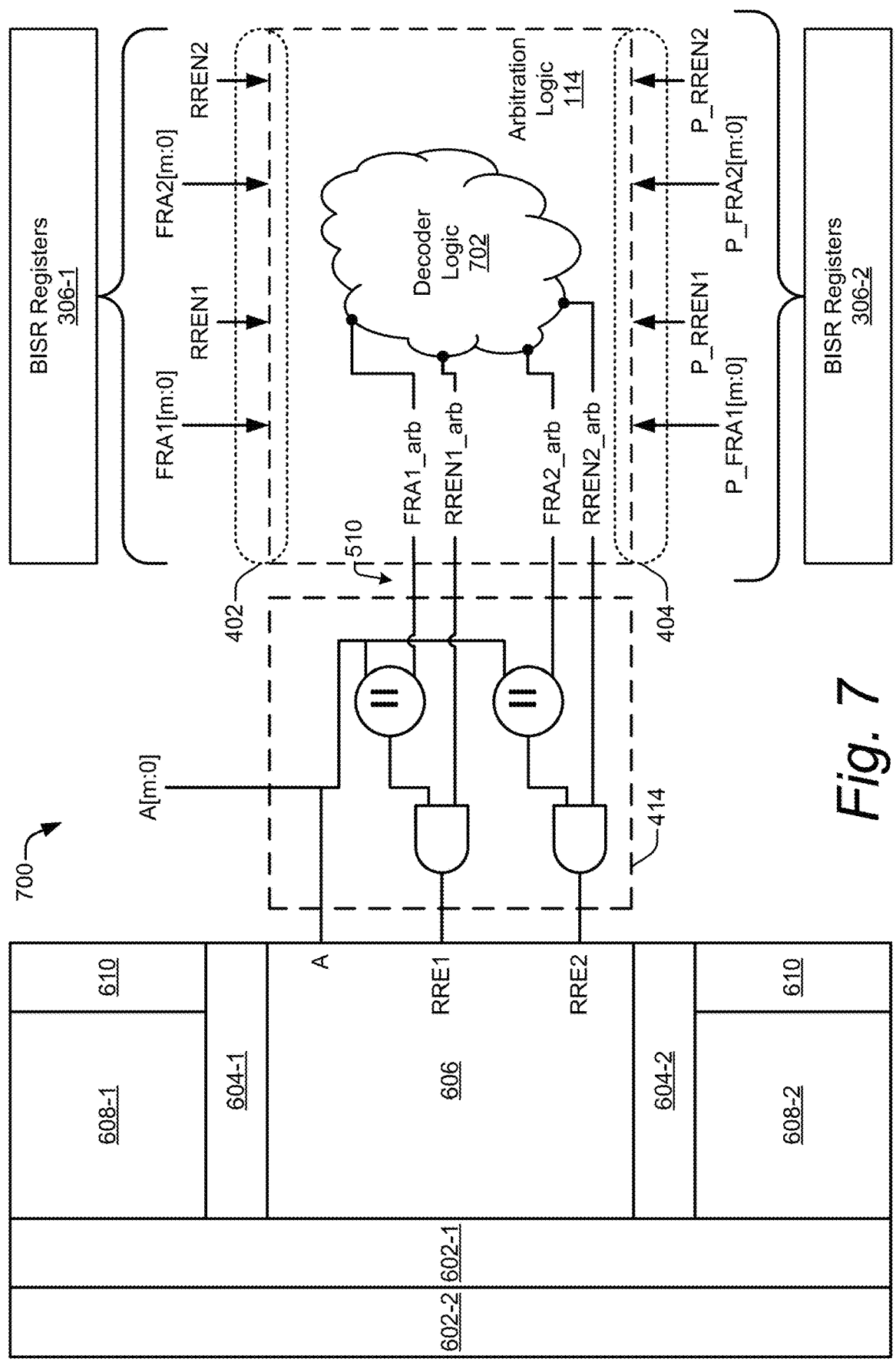
FIG. 7 illustrates example circuitry for an example second approach to performing logical memory repair in which a spare memory portion is implemented with a spare memory row.

FIG. 7 illustrates example circuitry 700 for an example second approach to performing logical memory repair in which a spare memory portion is implemented with a spare memory row. As shown, the arbitration logic 114 includes or instantiates multiple repair control ports 402 and 404. The arbitration logic 114 also includes decoder logic 702, which may be realized as row-decoder logic 702. In example implementations, the decoder logic 702 can provide enhanced row replacement support by correcting for a greater variety of potential multi-defect scenarios.

In some cases, with the example circuitry 600 that is explicitly depicted in FIG. 6, one set of spare rows is allocated to each logical memory. Consequently, some multi-defect scenarios can become unrepairable. The approach using repair-control ports, however, can correct for more diverse defect scenarios by allowing for independent BIRA at the logical memory level. To do so, each respective logical memory can be mapped to a respective repair control port. For example, the arbitration logic 114 can map a default repair control port 402 to a first logical memory of two or more logical memories. The arbitration logic 114 can map a pseudo repair control port 404 to a second logical memory of the two or more logical memories.

In FIG. 7, the first BISR registers 306-1 can provide at least one faulty row address (FRA) and at least one redundant row enable (RREN) signal. As shown for the default repair control port 402, the first BISR registers 306-1 can provide first and second faulty row addresses (FRA1 and FRA2) and first and second redundant row enable (RREN1 and RREN2) signals. In some scenarios, the "default" repair control port 402 can correspond to the logical memory that is tested first. The second BISR registers 306-2 can provide at least one pseudo faulty row address (P_FRA) and at least one pseudo redundant row enable (P_RREN) signal. As shown for the pseudo repair control port 404, the second BISR registers 306-2 can provide first and second pseudo faulty row addresses (P_FRA1 and P_FRA2) and first and second pseudo redundant row enable (P_RREN1 and P_RREN2) signals. Although one pseudo repair control port is shown, there may be multiple pseudo repair control ports corresponding to multiple logical memories in addition to a first-tested logical memory.

The decoder logic 702 decodes the BISR parameters as input from the first and second BISR registers 306-1 and 306-2 to provide arbitrated output values for the faulty row addresses and faulty redundant row enable signals as one or more arbitration signals 510. The one or more arbitration signals 510 function as a single repair control port at the physical-memory level. Thus, the arbitration logic 114 can convert the multiple repair control ports 402 and 404 into a single repair control port to access one or more spare memory portions (e.g., spare rows 602 or spare columns 604) of at least one physical memory. The arbitrated signals 510 are output by the decoder logic 702 of the arbitration logic 114 and provided to one or more repair ports (not separately indicated) of the repair logic 414. These values can include a first arbitrated faulty row addresses (FRA1_arb), a first arbitrated redundant row enable (RREN1_arb) signal, a second arbitrated faulty row addresses (FRA2_arb), and a second arbitrated redundant row enable (RREN2_arb) signal.

The pseudo repair control port allows for substantially independent BIRA of the second logical memory relative to the first logical memory. The decoder logic 702 can produce physical-memory-level row-repair control signals for the repair logic 414 from the logical-memory-level BISR parameters established by the MBIST controller that is external to the memory cluster. In example operations, the decoder logic 702 can determine these arbitrated values at the physical-memory level so that the first row redundancy-enable signal (RRE1) does not equal the second row redundancy-enable signal (RRE2) to avoid activating both of the replacement rows during a single access cycle.

The decoder logic 702 can be constructed using logic gates to implement a logical relationship between two or more signals. The logical relationship may depend, for instance, on the quantity of logical memories overlaid on the at least one physical memory and/or on the quantity of redundant replacement rows that are to be available. Table 1 below presents an example logical relationship between the multiple signals. The logical relationship depicts an example conversion of signals (e.g., values) at a logical-memory level to signals at a physical-memory level.

TABLE 1

Matrix with example logical relationship between signals for multiple repair control ports.

| RREN1 | RREN2 | P_RREN1 | P_RREN2 | RREN1_arb | RREN2_arb | FRA1_arb | FRA2_arb |
|---|---|---|---|---|---|---|---|
| 1 | 1 | X | X | 1 | 1 | FRA1 | FRA2 |
| 0 | 0 | 1 | 1 | 1 | 1 | P_FRA1 | P_FRA2 |
| 1 | 0 | 1 | X | 1 | '1' if (FRA1≠P_FRA1) else '0' | FRA1 | P_FRA1 |
| 1 | 0 | 0 | 0 | 1 | 0 | FRA1 | X |
| 0 | 0 | 1 | 0 | 1 | 0 | P_FRA1 | X |
| 0 | 0 | 0 | 0 | 0 | 0 | X | X |

Using the logical relationship presented in the matrix of Table 1, several multi-fault (e.g., multi-defect) scenarios across one or more logical memories can be repaired. For example, one fault in each of two logical memories that consume one spare row in each logical memory can be repaired. Second, one or two faults in a first of two logical memories can be repaired if the faults can be fixed with one or two rows, respectively. Third, one or two faults in a second of two logical memories can be repaired if the faults can be fixed with one or two rows, respectively. In these scenarios, {RREN1=0, RREN2=1} is considered an invalid condition. A three-fault scenario (e.g., a first logical memory of two logical memories has one fault and a second of the two logical memories has two faults, or vice versa) can be covered with additional overhead circuitry in the decoder logic 702. Further, additional BISR registers and/or repair control ports can be incorporated into decoder logic 702 that realizes an expanded logical relationship among the signals.

FIGS. 6 and 7 are described above in terms of spare rows that can replace faulty rows. For example, the decoder logic 702 is described as row-decoding logic. The principles, however, are applicable to circuitry in which spare columns (or other types of spare memory portions) can replace faulty columns (or other types of faulty memory portions). Example circuitry that can repair faults in memory columns is described next with reference to FIG. 8.

Figure 8:
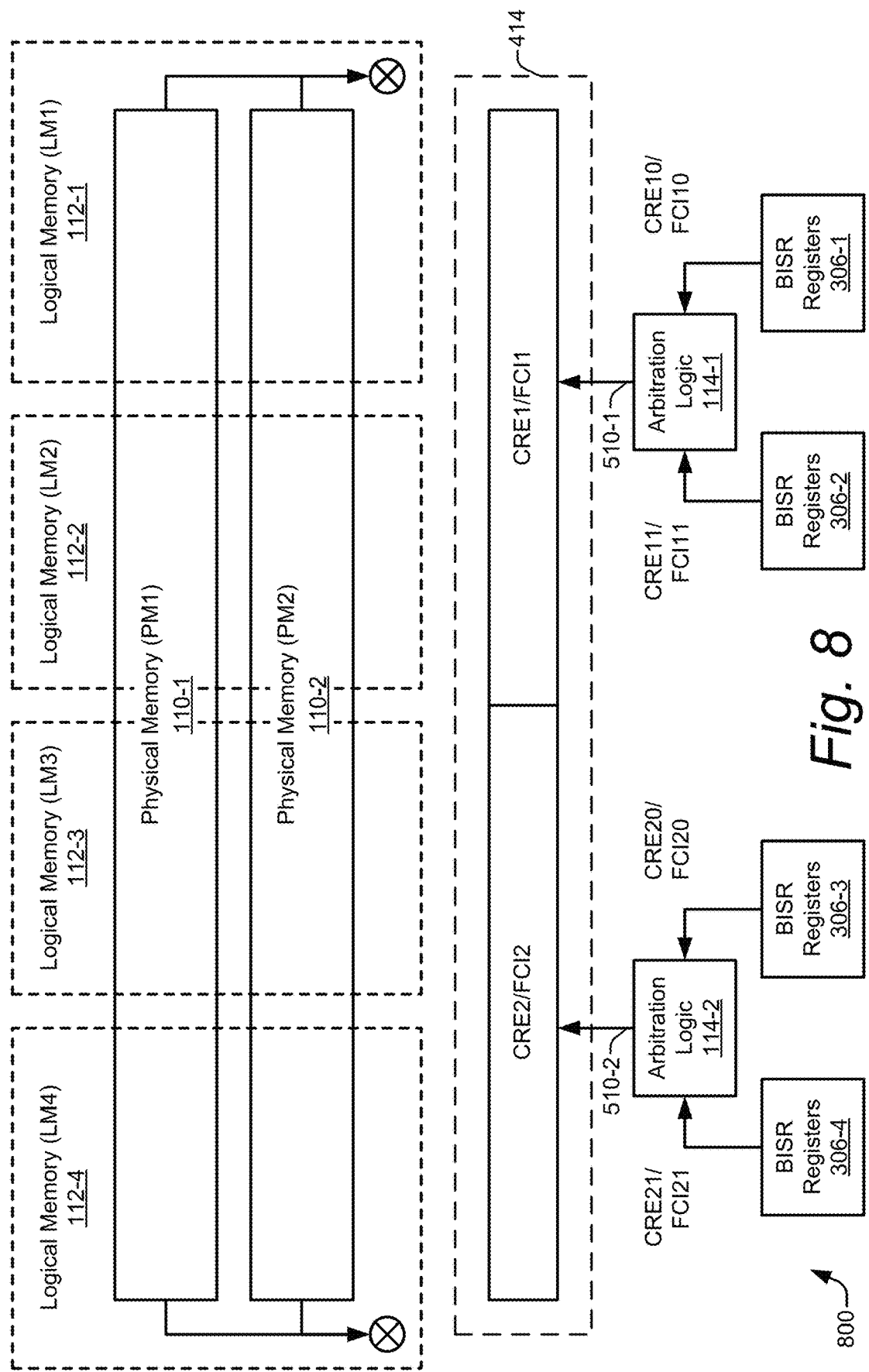
FIG. 8 illustrates example circuitry for performing logical memory repair in which a spare memory portion is implemented with a spare memory column.

FIG. 8 illustrates example circuitry 800 for performing logical memory repair in which a spare memory portion is implemented with a spare memory column. As illustrated, multiple logical memories (112-1, 112-2, 112-3, 112-4) are shared across multiple physical memories (110-1, 110-2). In this circuitry, a spare memory portion 506 includes or is realized as a spare memory column for replacing a faulty memory column. With continuing reference to the example split memory of FIGS. 6 and 7, the spare columns 604-1 and 604-2 respectively correspond to the left and right halves of physical memory 608-1 and 608-2. These spare columns are not shared between the halves. If four logical memories are overlaid on the split physical memory, however, each set of spare columns 604-1 and 604-2 is shared between two of the four logical memories.

A decision on whether a memory column that is targeted by a memory access request is a faulty memory column can be based on a Faulty Column Indicator (FCI) and a Column Row Enablement (CRE) signal from at least one BISR register 306. Thus, a first faulty memory address and a second faulty memory address can correspond to at least one memory column indicator identifying a memory column that is faulty (e.g., identifying a column of bits having at least one faulty bit). The one or more faulty memory column indicators can be stored in a BISR register 306 (e.g., a BISR register 306-1, 306-2, 306-3, and/or 306-4). Each respective BISR register 306 can store a respective indication of whether the associated faulty memory column indicator register stores a valid replacement indicator identifying a replacement column of bits.

In example implementations, the arbitration logic 114 and the repair logic 414 are each divided into two parts, such as arbitration logic 114-1 and 114-2. Each respective set of BISR registers 306-1, 306-2, 306-3, and 306-4 corresponds to a respective first, second, third, and fourth logical memory (not shown in FIG. 8) that can provide respective enablement indications and faulty column indicators CRE10/FCI10, CRE11/FCI11, CRE20/FCI20, and CRE21/FCI21. These enablement indications and faulty column indicators are provided to the arbitration logic 114-1 or 114-2 as shown. The instances of the arbitration logic 114-1 and 114-2 provide respective arbitration signals 510-1 and 510-2 to one or more repair ports of the repair logic 414 for respective ones of the first and second halves of physical memory 608-1 and 608-2 as indicated by the CRE1/FCI1 and CRE2/FCI2, respectively.

In these manners, faulty memory columns can be replaced by spare memory columns using at least one instance of arbitration logic 114 in a split memory environment while accounting for conflicts arising from performing memory tests at the logical memory level. The example implementations described herein with reference to FIGS. 6-8 relate to split memory environments. The described principles, however, as well as the logical memory repair techniques and apparatuses that are presented by this document, are applicable to memory environments generally.

Example Methods

Figure 9:
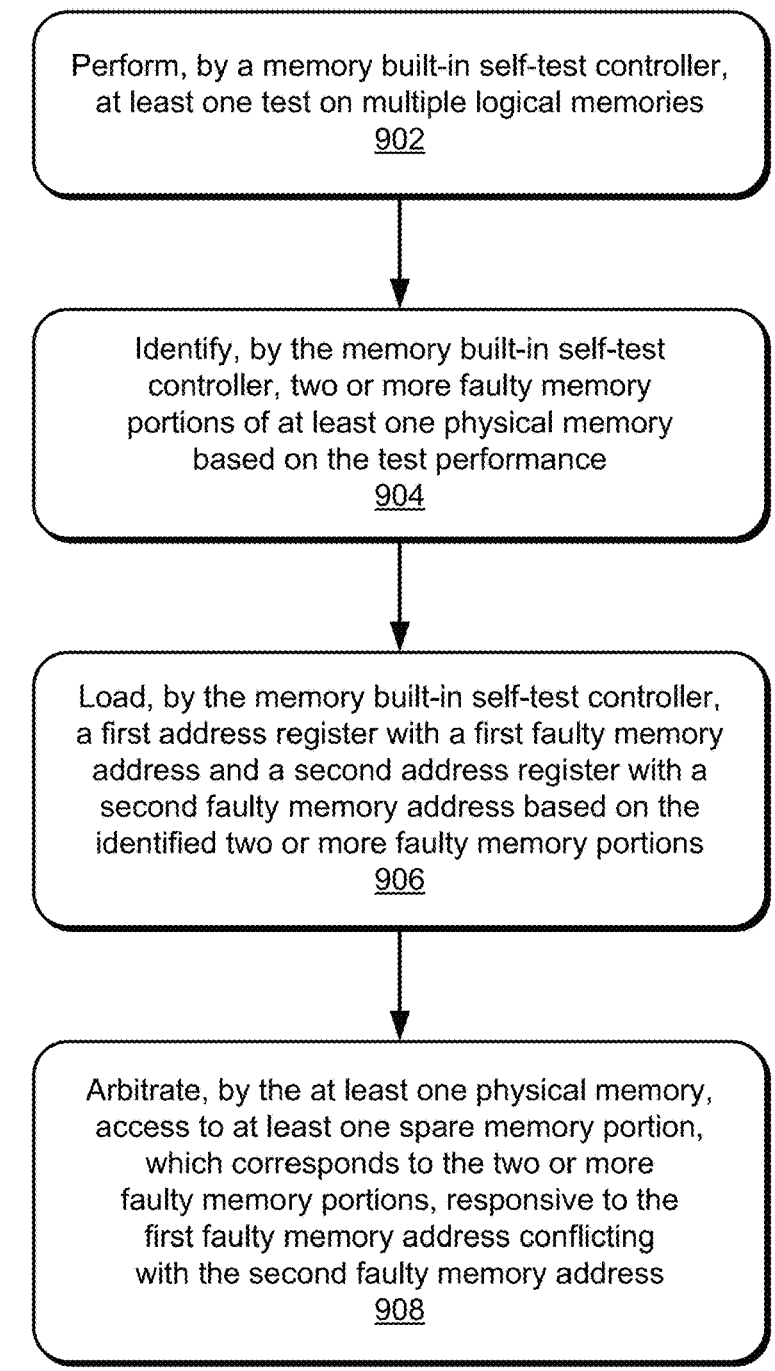
FIG. 9 illustrates example methods for performing logical memory repair with a shared physical memory.

FIG. 9 illustrates example methods 900 for performing logical memory repair with a shared physical memory. In these examples, a method can repair at least one physical memory that is behind a shared bus interface as part of a memory cluster and that is tested based on at least one logical memory, which is overlaid on the at least one physical memory.

At 902, a memory built-in self-test controller performs at least one test on multiple logical memories. In one example, an MBIST controller 108 can perform a test on a first logical memory 112-1 and a second logical memory 112-2, which are distributed across a single physical memory 110. In another example, the MBIST controller 108 can perform a test on multiple logical memories 112-1, 112-2, 112-3, and 112-4 that are distributed across multiple physical memories 110-1 and 110-2.

At 904, the memory built-in self-test controller identifies two or more faulty memory portions of at least one physical memory based on the performed test. For example, the MBIST controller 108 can identify a first memory portion 508-1 and a second memory portion 508-2 of at least one physical memory 110 as being faulty. Such faulty memory portions can correspond to at least one memory row, at least one memory column, at least one memory row and at least one memory column, and so forth. The performed test can correspond to one or more standard MBIST testing algorithms.

At 906, the memory built-in self-test controller loads a first address register with a first faulty memory address and a second address register with a second faulty memory address based on the identified two or more faulty memory portions. For example, the MBIST controller 108 can load a first address register 502-1 with a first faulty memory address and a second address register 502-2 with a second faulty memory address. Each faulty memory address may correspond, for instance, to a memory portion 508 that is identified as being faulty responsive to a test. In some cases, the first faulty memory address, which is stored in the first address register 502-1, may match (e.g., be equal to) the second faulty memory address, which is stored in the second address register 502-2. Without employing arbitration logic 114, these matching faulty memory addresses can cause two redundancy-enable signals to be active at one time, which can lead to errors with the address decoding. The arbitration logic 114, however, can resolve such conflicting addresses.

At 908, the at least one physical memory arbitrates access to at least one spare memory portion, which corresponds to the two or more faulty memory portions, responsive to the first faulty memory address conflicting with the second faulty memory address. For example, arbitration logic 114 of the at least one physical memory 110 can arbitrate access to a spare memory portion 506 used for repairing a corresponding failed memory portion. For instance, the arbitration logic 114 may cause repair logic 414 to assert a first memory portion redundancy-enable signal and cause the repair logic 414 to de-assert a second memory portion redundancy-enable signal. Alternatively, the arbitration logic 114 may cause the repair logic 414 to de-assert the first memory portion redundancy-enable signal and cause the repair logic 414 to assert the second memory portion redundancy-enable signal.

Generally, any of the components, modules, methods/processes, and operations described herein can be implemented using software, firmware, hardware (e.g., fixed logic circuitry), or any combination thereof. Some operations of the example methods or processes may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, but without limitation, Field-programmable Gate Arrays (FPGAs), Application-specific Integrated Circuits (ASICs), Application-Specific Standard Products (ASSPs), System-on-a-Chip systems (SoCs), Complex Programmable Logic Devices (CPLDs), and the like.

Some examples are described below:

Example 1

An apparatus comprising: a memory built-in self-test controller including circuitry configured to perform at least one test on multiple logical memories; and a memory cluster including: a shared bus interface coupled to the memory built-in self-test controller and configured to provide access to the multiple logical memories; and multiple physical memories coupled to the shared bus interface, the multiple physical memories including at least one physical memory configured to have two or more logical memories of the multiple logical memories overlaid thereon, the at least one physical memory including: a first address register configured to store a first faulty memory address as determined by the memory built-in self-test controller; a second address register configured to store a second faulty memory address as determined by the memory built-in self-test controller; and arbitration logic coupled to the first address register and the second address register, the arbitration logic including circuitry configured to arbitrate access to at least one spare memory portion responsive to the first faulty memory address conflicting with the second faulty memory address.

Example 2

The apparatus of example 1, wherein: the two or more logical memories of the multiple logical memories comprise a first logical memory and a second logical memory; the first logical memory and the second logical memory of the two or more logical memories are configured to share the at least one physical memory; the circuitry of the memory built-in self-test controller is configured to determine the first faulty memory address, which corresponds to the at least one physical memory, by testing the first logical memory of the two or more logical memories; and the circuitry of the memory built-in self-test controller is configured to determine the second faulty memory address, which corresponds to the at least one physical memory, by testing the second logical memory of the two or more logical memories.

Example 3

The apparatus of one of example 1 or example 2, wherein: the circuitry of the memory built-in self-test controller is configured to access the multiple logical memories using logical memory addresses; and the shared bus interface is configured to map the logical memory addresses to physical memory addresses of the multiple physical memories.

Example 4

The apparatus of any one of the preceding examples, wherein: the first faulty memory address and the second faulty memory address comprise a same physical memory address of the physical memory addresses and correspond to a same spare memory portion of the at least one spare memory portion; and the circuitry of the arbitration logic is configured to route memory requests that are associated with different logical memories of the two or more logical memories and that target the same physical memory address to the same spare memory portion.

Example 5

The apparatus of any one of the preceding examples, wherein: the at least one spare memory portion comprises at least one spare memory row; and the first faulty memory address and the second faulty memory address comprise at least one memory row address of at least one memory row that is faulty of the at least one physical memory.

Example 6

The apparatus of any one of the preceding examples, wherein: the at least one spare memory portion comprises at least one spare memory column; and the first faulty memory address and the second faulty memory address correspond to at least one memory column indicator of at least one memory column that is faulty of the at least one physical memory.

Example 7

The apparatus of any one of the preceding examples, wherein: the at least one physical memory includes: a first enablement register configured to store a first indication of whether a first faulty memory portion has been replaced by a first spare memory portion, the first faulty memory portion corresponding to the first faulty memory address; and a second enablement register configured to store a second indication of whether a second faulty memory portion has been replaced by a second spare memory portion, the second faulty memory portion corresponding to the second faulty memory address; and the circuitry of the arbitration logic is configured to arbitrate access to the first spare memory portion or the second spare memory portion responsive to the first indication and the second indication.

Example 8

The apparatus of any one of the preceding examples, wherein the circuitry of the arbitration logic is configured to: prevent a first memory portion redundancy-enable signal and a second memory portion redundancy-enable signal from being simultaneously active responsive to the first faulty memory address matching the second faulty memory address.

Example 9

The apparatus of any one of the preceding examples, wherein: the at least one physical memory includes: repair logic including circuitry configured to direct a memory access request to a spare memory portion based on a memory address targeted by the memory access request, the first faulty memory address, and the second faulty memory address; at least one memory array; and an address decoder coupled to the at least one memory array; and the repair logic is coupled between the arbitration logic and the address decoder.

Example 10

The apparatus of any one of the preceding examples, wherein the arbitration logic includes: a first repair control port mapped to a first logical memory of the two or more logical memories; and a second repair control port mapped to a second logical memory of the two or more logical memories.

Example 11

A method comprising: performing, by a memory built-in self-test controller, at least one test on multiple logical memories; identifying, by the memory built-in self-test controller, two or more faulty memory portions of at least one physical memory based on the performing; loading, by the memory built-in self-test controller, a first address register with a first faulty memory address and a second address register with a second faulty memory address based on the identifying; and arbitrating, by the at least one physical memory, access to at least one spare memory portion, which corresponds to the two or more faulty memory portions, responsive to the first faulty memory address conflicting with the second faulty memory address.

Example 12

The method of example 11, wherein the arbitrating comprises, responsive to the first faulty memory address matching the second faulty memory address: causing repair logic to assert a first memory portion redundancy-enable signal;

and causing the repair logic to de-assert a second memory portion redundancy-enable signal.

Example 13

The method of one of example 11 or example 12, wherein the arbitrating comprises, responsive to the first faulty memory address not matching the second faulty memory address: allowing the repair logic to control the first memory portion redundancy-enable signal and the second memory portion redundancy-enable signal based on the first faulty memory address and the second faulty memory address.

Example 14

The method of any one of examples 11-13, further comprising: loading, by the memory built-in self-test controller, a first enablement register with a first indication of whether a first faulty memory portion has been replaced by a first spare memory portion based on the identifying; and loading, by the memory built-in self-test controller, a second enablement register with a second indication of whether a second faulty memory portion has been replaced by a second spare memory portion based on the identifying, wherein the arbitrating comprises arbitrating access to the at least one spare memory portion responsive to the first indication and the second indication.

Example 15

An apparatus comprising: one or more processors; at least one memory cluster; at least one memory built-in self-test controller coupled to the at least one memory cluster; and at least one computer-readable storage medium having stored thereon instructions that, responsive to execution by the one or more processors, cause the one or more processors to execute the method of any one of examples 11 to 14.

Example 16

An apparatus comprising: a memory built-in self-test controller including circuitry configured to perform at least one test on multiple logical memories; and a memory cluster including: a shared bus interface coupled to the memory built-in self-test controller and configured to provide access to the multiple logical memories; and at least one physical memory coupled to the shared bus interface and configured to have two or more logical memories of the multiple logical memories overlaid thereon, the at least one physical memory including: one or more built-in self-repair registers configured to store one or more built-in self-repair parameters established by the memory built-in self-test controller based on the at least one test performed on the multiple logical memories; repair logic; an address decoder coupled to the repair logic; and arbitration logic coupled between the one or more built-in self-repair registers and the repair logic, the arbitration logic including circuitry configured to convert the built-in self-repair parameters into physical-memory level built-in self-repair parameters.

Example 17

The apparatus of any one of examples 1-10 or 16, wherein: the memory built-in self-test controller is configured to establish the one or more built-in self-repair parameters on a logical-memory level by testing at least a first logical memory and a second logical memory of the multiple logical memories that are overlaid on the at least one physical memory.

Example 18

The apparatus of any one of examples 1-10, 16, or 17, wherein: the at least one physical memo3ry comprises a memory wrapper that uses the arbitration logic to arbitrate, in a manner that is transparent to operations of the memory built-in self-test controller, scenarios in which a first faulty memory address conflicts with a second faulty memory address.

Example 19

The apparatus of any one of examples 1-10 or 16-18, wherein the arbitration logic is configured to: provide a respective repair control port of multiple repair control ports for a respective logical memory of the multiple logical memories; and convert the multiple repair control ports into a single repair control port to access one or more spare memory portions of the at least one physical memory.

Example 20

The apparatus of any one of examples 1-10 or 16-19, wherein: the apparatus comprises a mobile electronic device; and the mobile electronic device includes a system-on-chip that includes the memory built-in self-test controller and the memory cluster.

CONCLUSION

Although aspects of logical memory repair with a shared physical memory have been described in language specific to features and/or methods, the subject of the appended claims is not necessarily limited to the specific features or methods described. Rather, the specific features and methods are disclosed as example implementations of the claimed logical memory repair, and other equivalent features and methods are intended to be within the scope of the appended claims. Further, various aspects are described, and it is to be appreciated that each described aspect can be implemented independently or in connection with one or more other described aspects.

What is claimed is:

1. An apparatus comprising:
a memory built-in self-test controller including circuitry configured to perform at least one test on multiple logical memories; and
a memory cluster including:
a shared bus interface coupled to the memory built-in self-test controller and configured to provide access to the multiple logical memories; and
multiple physical memories coupled to the shared bus interface, the multiple physical memories including at least one physical memory configured to have two or more logical memories of the multiple logical memories overlaid thereon, the at least one physical memory including:
a first address register configured to store a first faulty memory address as determined by the memory built-in self-test controller;
a second address register configured to store a second faulty memory address as determined by the memory built-in self-test controller; and arbitration logic coupled to the first address register and the second address register, the arbitration logic including circuitry configured to arbitrate access to at least one spare memory portion responsive to the first faulty memory address conflicting with the second faulty memory address.

2. The apparatus of claim 1, wherein:
the two or more logical memories of the multiple logical memories comprise a first logical memory and a second logical memory;
the first logical memory and the second logical memory of the two or more logical memories are configured to share the at least one physical memory;
the circuitry of the memory built-in self-test controller is configured to determine the first faulty memory address, which corresponds to the at least one physical memory, by testing the first logical memory of the two or more logical memories; and
the circuitry of the memory built-in self-test controller is configured to determine the second faulty memory address, which corresponds to the at least one physical memory, by testing the second logical memory of the two or more logical memories.

3. The apparatus of claim 1, wherein:
the circuitry of the memory built-in self-test controller is configured to access the multiple logical memories using logical memory addresses; and
the shared bus interface is configured to map the logical memory addresses to physical memory addresses of the multiple physical memories.

4. The apparatus of claim 3, wherein:
the first faulty memory address and the second faulty memory address comprise a same physical memory address of the physical memory addresses and correspond to a same spare memory portion of the at least one spare memory portion; and
the circuitry of the arbitration logic is configured to route memory requests that are associated with different logical memories of the two or more logical memories and that target the same physical memory address to the same spare memory portion.

5. The apparatus of claim 1, wherein:
the at least one spare memory portion comprises at least one spare memory row; and
the first faulty memory address and the second faulty memory address comprise at least one memory row address of at least one memory row that is faulty of the at least one physical memory.

6. The apparatus of claim 1, wherein:
the at least one spare memory portion comprises at least one spare memory column; and
the first faulty memory address and the second faulty memory address correspond to at least one memory column indicator of at least one memory column that is faulty of the at least one physical memory.

7. The apparatus of claim 1, wherein:
the at least one physical memory includes:
a first enablement register configured to store a first indication of whether a first faulty memory portion has been replaced by a first spare memory portion, the first faulty memory portion corresponding to the first faulty memory address; and
a second enablement register configured to store a second indication of whether a second faulty memory portion has been replaced by a second spare memory portion, the second faulty memory portion corresponding to the second faulty memory address; and
the circuitry of the arbitration logic is configured to arbitrate access to the first spare memory portion or the second spare memory portion responsive to the first indication and the second indication.

8. The apparatus of claim 1, wherein the circuitry of the arbitration logic is configured to:
prevent a first memory portion redundancy-enable signal and a second memory portion redundancy-enable signal from being simultaneously active responsive to the first faulty memory address matching the second faulty memory address.

9. The apparatus of claim 1, wherein:
the at least one physical memory includes:
repair logic including circuitry configured to direct a memory access request to a spare memory portion based on a memory address targeted by the memory access request, the first faulty memory address, and the second faulty memory address;
at least one memory array; and
an address decoder coupled to the at least one memory array; and
the repair logic is coupled between the arbitration logic and the address decoder.

10. The apparatus of claim 1, wherein the arbitration logic includes:
a first repair control port mapped to a first logical memory of the two or more logical memories; and
a second repair control port mapped to a second logical memory of the two or more logical memories.

11. A method comprising:
performing, by a memory built-in self-test controller, at least one test on multiple logical memories;
identifying, by the memory built-in self-test controller, two or more faulty memory portions of at least one physical memory based on the performing;
loading, by the memory built-in self-test controller, a first address register with a first faulty memory address and a second address register with a second faulty memory address based on the identifying; and
arbitrating, by the at least one physical memory, access to at least one spare memory portion, which corresponds to the two or more faulty memory portions, responsive to the first faulty memory address conflicting with the second faulty memory address.

12. The method of claim 11, wherein the arbitrating comprises, responsive to the first faulty memory address matching the second faulty memory address:
causing repair logic to assert a first memory portion redundancy-enable signal; and
causing the repair logic to de-assert a second memory portion redundancy-enable signal.

13. The method of claim 12, wherein the arbitrating comprises, responsive to the first faulty memory address not matching the second faulty memory address:
allowing the repair logic to control the first memory portion redundancy-enable signal and the second memory portion redundancy-enable signal based on the first faulty memory address and the second faulty memory address.

14. The method of claim 11, further comprising:
loading, by the memory built-in self-test controller, a first enablement register with a first indication of whether a first faulty memory portion has been replaced by a first spare memory portion based on the identifying; and loading, by the memory built-in self-test controller, a second enablement register with a second indication of whether a second faulty memory portion has been replaced by a second spare memory portion based on the identifying, wherein the arbitrating comprises arbitrating access to the at least one spare memory portion responsive to the first indication and the second indication.

15. The method of claim 12, wherein the arbitrating further comprises:

preventing the first memory portion redundancy-enable signal and the second memory portion redundancy-enable signal from being simultaneously active responsive to the first faulty memory address matching the second faulty memory address.

16. An apparatus comprising:

a memory built-in self-test controller including circuitry configured to perform at least one test on multiple logical memories; and a memory cluster including:

a shared bus interface coupled to the memory built-in self-test controller and configured to provide access to the multiple logical memories; and at least one physical memory coupled to the shared bus interface and configured to have two or more logical memories of the multiple logical memories overlaid thereon, the at least one physical memory including:

one or more built-in self-repair registers configured to store one or more built-in self-repair parameters established by the memory built-in self-test controller based on the at least one test performed on the multiple logical memories;

repair logic;

an address decoder coupled to the repair logic; and arbitration logic coupled between the one or more built-in self-repair registers and the repair logic, the arbitration logic including circuitry configured to convert the built-in self-repair parameters into physical-memory level built-in self-repair parameters.

17. The apparatus of claim 16, wherein:

the memory built-in self-test controller is configured to establish the one or more built-in self-repair parameters on a logical-memory level by testing at least a first logical memory and a second logical memory of the multiple logical memories that are overlaid on the at least one physical memory.

18. The apparatus of claim 16, wherein:

the at least one physical memory comprises a memory wrapper configured to use the arbitration logic to arbitrate, in a manner that is transparent to operations of the memory built-in self-test controller, scenarios in which a first faulty memory address conflicts with a second faulty memory address.

19. The apparatus of claim 16, wherein the arbitration logic is configured to:

provide a respective repair control port of multiple repair control ports for a respective logical memory of the multiple logical memories; and convert the multiple repair control ports into a single repair control port to access one or more spare memory portions of the at least one physical memory.

20. The apparatus of claim 16, wherein:

the apparatus comprises a mobile electronic device; and the mobile electronic device includes a system-on-chip that includes the memory built-in self-test controller and the memory cluster.

* * * * *